July 23, 1957

C. H. BRUNT 2,800,619

ELECTRIC MOTORS

Filed Sept. 6, 1956.

Inventor
Charles H. Brunt
By
Attorney

July 23, 1957  C. H. BRUNT  2,800,619
ELECTRIC MOTORS
Filed Sept. 6, 1956  5 Sheets-Sheet 2

Inventor
Charles H. Brunt
By
Attorney

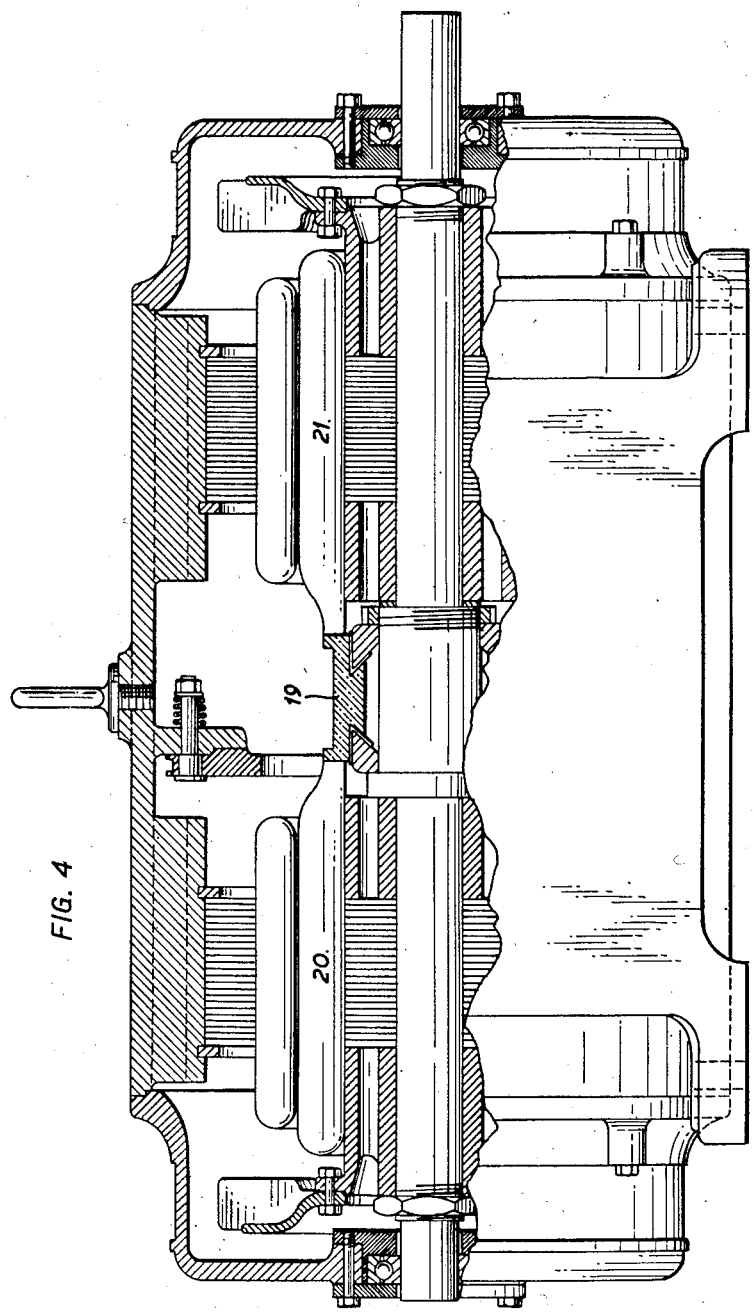

July 23, 1957

C. H. BRUNT 2,800,619

ELECTRIC MOTORS

Filed Sept. 6, 1956

Inventor
Charles H. Brunt
By
Attorney

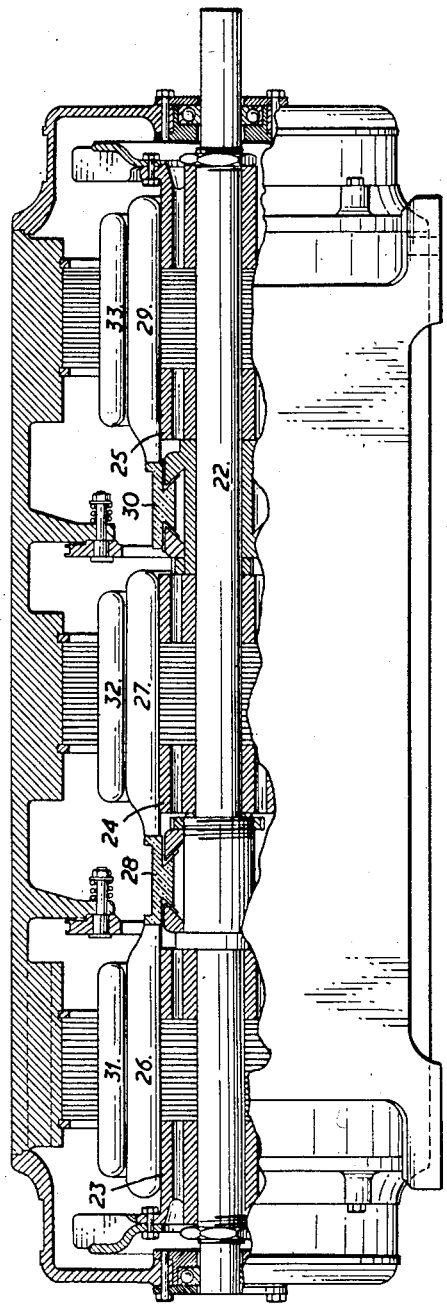

United States Patent Office 2,800,619  
Patented July 23, 1957

2,800,619

ELECTRIC MOTORS

Charles Henry Brunt, Oldham, England

Application September 6, 1956, Serial No. 608,263

Claims priority, application Great Britain
September 13, 1955

6 Claims. (Cl. 318—45)

This invention relates to electric motors and has for its object to provide an electric motor or combination of electric motors the speed of which is infinitely variable from a low speed, for example forty five revolutions per minute, to a high speed, for example six thousand revolutions per minute, and if desired can be made also to be reversible.

According to the invention each set of field windings acting on a separate rotary armature of an electric alternating current repulsion motor or motors is connected to a different phase or combination of phases of the same three phase alternating current line and the brushes, provided to short circuit the armature windings, are angularly adjustable.

The invention also consists in a variable speed electric alternating current repulsion motor or combination of mechanically connected electric alternating current repulsion motors having short circuited angularly adjustable commutator brushes and separate stationary field windings each of which co-operates with a separate rotary armature and is adapted to be supplied with the combined current from a different combination composed of two phases or with the current from a different single phase of the same three-phase alternating current mains.

The armatures may be provided on a common shaft constituting the motor shaft.

Alternatively the armatures may be provided on separate shafts which are connected together to provide a joint drive.

The separate shafts may be connected together by mechanical couplings or toothed or belt or other friction gearing.

There may be two or three separate armatures provided on a common motor shaft.

The windings of two armatures may be connected to a common commutator having a common set of adjustable brushes serving to connect together the ends of the windings of both armatures as required.

In order that the invention may be fully understood and more readily performed, there has been caused to be appended hereunto drawings illustrating diagrammatically various constructional examples thereof, wherein:

Figure 4 is a side view, partly in section, of an electric motor and illustrates a second construction;

Figure 7 is a side view, partly in section, of an electric motor and illustrates a third construction;

Figure 1:
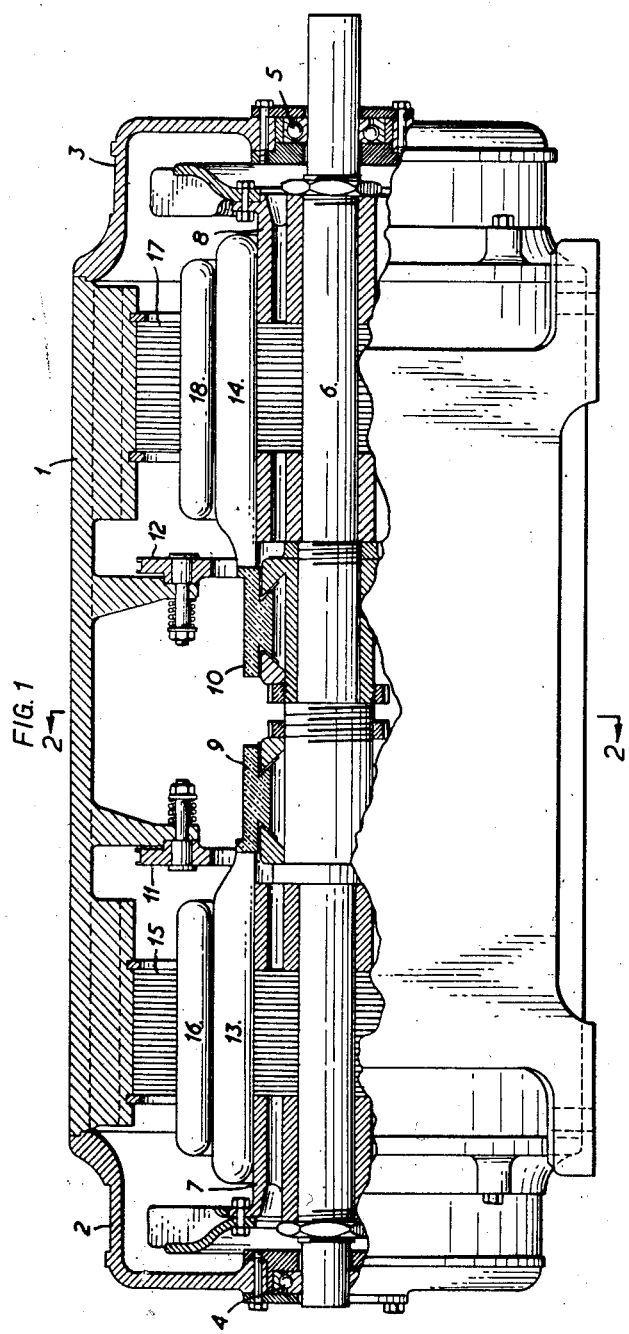
Figure 1 is a side view partly in section of an electric motor and illustrates one construction.
Figure 2:
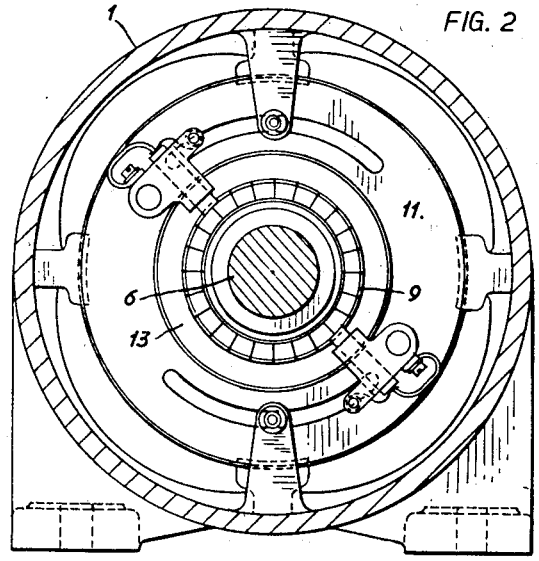
Figure 2 is a detached end view of the same and illustrates a detail.
Figure 3:
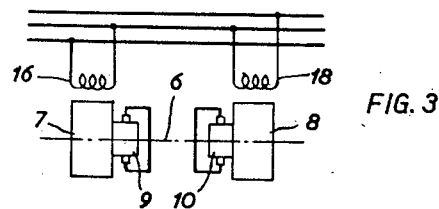
Figure 3 is a connection diagram.

Referring to the construction shown in Figures 1 and 2 there is a stationary motor casing 1 carrying end members 2 and 3 respectively provided with ball bearings 4 and 5 respectively in which a motor shaft 6 is rotatably mounted. The shaft 6 has an armature 7 and a separate armature 8 mounted on it to rotate therewith, each armature having a laminated core carrying armature windings 13 and 14 respectively. The windings of the armature 7 are connected to a commutator 9 and the windings of the armature 8 are connected to a commutator 10. The commutators 9 and 10 rotate with the shaft 6 and the brushes of the commutator are mounted on rings 11 and 12 respectively, both of which are angularly adjustable, for example through an angle of 90°, if the spindle 6 is intended to be rotated at different speeds but always in the same direction, or for example through an angle of 120°, as shown in Figure 2, if the spindle 6 is to be rotated at different speeds and in different directions. The brushes of each commutator are short circuited in a manner already known in electric alternating current repulsion motors. To act on the armature 7 there is a field 15 carried by the casing 1 and composed of a laminated core and field windings 16 which will safely carry the combined voltages across two phases of a three phase alternating current and having two or multiples of two poles. To act on the armature 8 there is a field 17 carried by the casing 1 and composed of a laminated core and field windings 18 which will safely carry the combined voltages of two phases of a three phase current. The field 17 is additional to the field 15 and has two or multiples of two poles. The field windings are adapted to be connected to a three phase current line by connection of the field winding 16 across two phases of the line and the field winding 18 across one of said two phases and the remaining phase of the said line, so that the field 15 is excited by two phases in the manner of an alternating current single phase repulsion motor and the field 17 is excited by a different combination composed of two phases in the manner of another alternating current motor, the two combinations of phases, however, being different two phase combinations of the same three phase alternating current. For use the field windings are connected as stated and when so connected, the speed of rotation of the shaft 6 under the action of the fields on the armatures can be infinitely varied, under normal loading, by angular adjustment of the rings 11 and 12 from about forty five to about six thousand revolutions per minute, and the direction of rotation of the said shaft can also be reversed.

An electric motor of the described construction can be made suitable for driving relatively light loads and to give a wider range of speeds than a three phase non-repulsion commutator motor. It can be incorporated in apparatus for testing fuel injection or fuel delivery rates or electrical apparatus at different speeds, in place of a constant speed electric motor and an infinitely variable transmission gear driven by the constant speed motor and thereby avoid the cost and complications resulting from the provision of the said gear.

Figure 6:
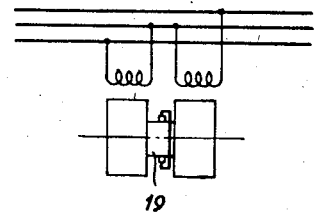
Figure 6 is another connection diagram.
Figure 5:
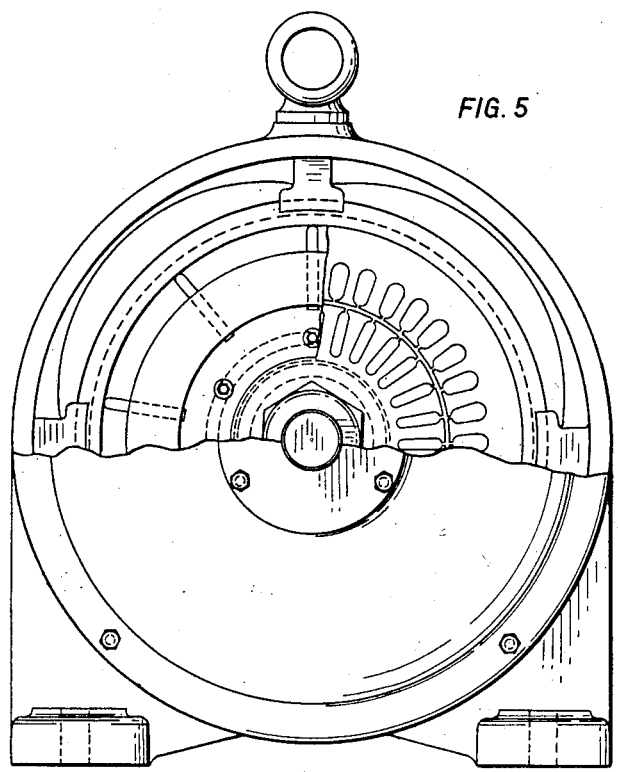
Figure 5 is an end view, partly in section, of the second named construction.

The construction shown in Figures 4 and 5 differs from that shown in Figures 1 and 2 by the provision of a single commutator 19 in place of separate commutators, the commutator 19 being connected and therefore common to the armature windings 20 of the one armature and to the armature windings 21 of the second armature and thereby reducing the length of the motor and the number of parts and amount of material and labour required to produce the same. As indicated in Figure 6, the two separate field windings of this construction, in common with the construction shown in Figures 1 and 2, are the only windings arranged to be supplied with current and are fed from different combinations each composed of two phases of a three phase current.

Figure 8:
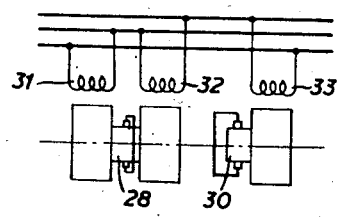
Figure 8 is still another connection diagram.

In the construction shown in Figure 7, the electric motor has a shaft 22 on which there are three armatures 23, 24 and 25 respectively of the hereinbefore described construction, the windings 26 of the armatures 23 and the windings 27 of the armature 24 being connected to a common commutator 28 and the winding 29 of the armature 25 being connected to a separate commutator 30. There is a field winding 31 for action on the armature 23, a field winding 32 for action on the armature 24 and a field winding 33 for action on the armature 25. As indicated in Figure 8, the field winding 31 is to be arranged across a combination of two phases of an electric alternating three phase current, the field winding 32 to be across a second combination of two phases of the said current and the field winding 33 to be across a third combination of two phases of the said current, each of the three separate field windings therefore being in a different combination composed of two phases of the same three phase current.

Figures 9, 10:
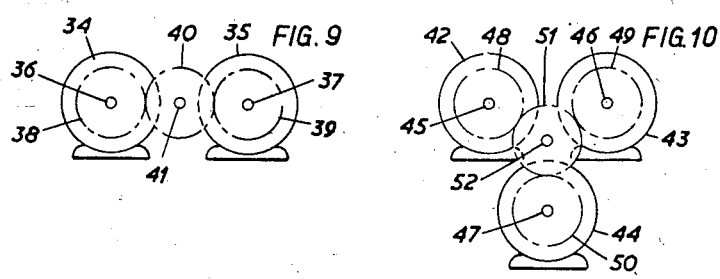
Figure 9 is an end elevation of a combination of electric motors and illustrates a fourth construction.
Figure 10 is an end elevation of a combination of electric motors and illustrates a fifth construction.

In the construction illustrated in Figure 9 there are two separate alternating current repulsion motors 34 and 35 respectively, each having its own field, armature and commutator with short circuited brushes adjustable over an angle of about ninety degrees or about one hundred and twenty degrees, and with motor shafts 36 and 37 respectively. The said shafts are provided with toothed gear wheels 38 and 39 respectively which mesh with a toothed gear wheel 40 provided on a suitably journalled shaft 41 from which the joint drives of the two motors are taken. The field windings of each of the two motors is arranged to be connected to a two phase combination of the same three phase alternating current.

In the construction illustrated in Figure 10, there are three electric alternating current repulsion motors 42, 43 and 44 respectively each having its own armature commutator with short circuited brushes adjustable over an angle of about ninety degrees or about one hundred and twenty degrees, and field winding arranged in a different two phase combination of the same three phase alternating current. The said motors have motor shafts 45, 46 and 47 respectively provided with toothed gear wheels 48, 49 and 50 respectively. All three gear wheels mesh with a gear wheel 51 mounted on a suitably journalled shaft 52 from which the joint drives of the three motors are taken.

Figure 11:
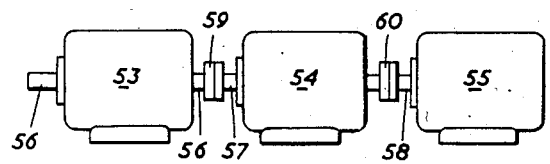
Figure 11 is a side elevation and illustrates a sixth construction.

In the construction illustrated in Figure 11, there are three electric alternating current repulsion motors 53, 54 and 55 respectively of similar construction to the motors 42, 43 and 44 and having each of their separate field windings connected to a different two phase combination of the same three phase alternating current. The motors have motor shafts 56, 57 and 58 respectively, coupled together by couplings 59 and 60, the joint drive of the three motors being taken from the shaft 56.

In the case of a motor having three separate fields or three motors each having a separate field, each set of field windings may alternatively but not preferably, be connected across a neutral and one different phase of the same three phase alternating current. In that case the windings may be made only sufficiently safe to carry the voltage of a single phase of a three phase alternating current.

I claim:

1. A variable speed alternating current repulsion motor assembly including a plurality of rotary armatures, a set of field windings for and acting upon each of said armatures, and angularly adjustable brushes for short-circuiting the windings of said armatures and controlling the speed of said motor assembly, said sets of field windings each being connected to a different combination of phases of the same three phase alternating current mains.

2. A variable speed alternating current repulsion motor assembly comprising a motor shaft, a plurality of rotary armatures on said shaft, a set of field windings for and acting upon each of said armatures, and angularly adjustable brushes for short-circuiting the windings of said armatures and controlling the speed of said motor assembly, said sets of field windings each being connected to a different combination of phases of the same three phase alternating current mains.

3. A variable speed alternating current repulsion motor assembly comprising a plurality of shafts connected mechanically to provide a single output, an armature on each of said shafts, a set of field windings for and acting upon each of said armatures, and angularly adjustable brushes for short-circuiting the windings of said armatures and controlling the speed of said motor assembly, said sets of field windings each being connected to a different combination of phases of the same three phase alternating current mains.

4. A variable speed alternating current repulsion motor assembly comprising a motor shaft, a plurality of rotary armatures on said shaft, a set of field windings for and acting upon each of said armatures, a common commutator connected to the windings of each of said armatures and angularly adjustable brushes for short-circuiting the windings of said armatures and controlling the speed of said motor assembly, said sets of field windings each being connected to a different combination of phases of the same three phase alternating current mains.

5. A variable speed alternating current repulsion motor assembly comprising a motor shaft, a plurality of rotary armatures on said shaft, a set of field windings, wound to carry the combined voltage of two phases of a three phase alternating current, for and acting upon each of said armatures, a common commutator connected to the windings of each of said armatures, angularly adjustable brushes for short-circuiting the windings of said armatures and controlling the speed of said motor assembly, said sets of field windings each being connected across a different combination of two phases of a three phase alternating current mains.

6. A variable speed alternating current repulsion motor comprising three rotary armatures, a set of field windings for and acting upon each of said armatures, and angularly adjustable brushes for short-circuiting the windings of said armatures and controlling the speed of said motor assembly, said field windings being connected to a different phase of the same three phase alternating current mains.

No references cited.